US008024726B2

(12) United States Patent
Armstrong et al.

(10) Patent No.: US 8,024,726 B2
(45) Date of Patent: Sep. 20, 2011

(54) SYSTEM FOR CORRECT DISTRIBUTION OF HYPERVISOR WORK

(75) Inventors: William Joseph Armstrong, Rochester, MN (US); Christopher Francois, Apple Valley, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1716 days.

(21) Appl. No.: 10/857,744

(22) Filed: May 28, 2004

(65) Prior Publication Data

US 2005/0278722 A1    Dec. 15, 2005

(51) Int. Cl.
G06F 9/445 (2006.01)
G06F 9/46 (2006.01)
(52) U.S. Cl. ............................................. 718/1; 718/104
(58) Field of Classification Search .................. 718/100, 718/101, 102, 104, 105, 1
See application file for complete search history.

(56) References Cited

U.S. PATENT DOCUMENTS

| | | | | |
|---|---|---|---|---|
| 4,649,479 A * | 3/1987 | Advani et al. | ...................... | 718/1 |
| 4,843,541 A * | 6/1989 | Bean et al. | ...................... | 710/36 |
| 6,253,224 B1 * | 6/2001 | Brice et al. | ......................... | 718/1 |
| 6,381,682 B2 * | 4/2002 | Noel et al. | ..................... | 711/153 |
| 6,691,146 B1 * | 2/2004 | Armstrong et al. | ........... | 718/100 |
| 6,892,383 B1 * | 5/2005 | Arndt | ................................ | 718/1 |
| 7,003,771 B1 * | 2/2006 | Arndt | ............................ | 718/104 |
| 7,096,469 B1 | 8/2006 | Kubala et al. | | |
| 7,139,855 B2 * | 11/2006 | Armstrong et al. | ........... | 710/200 |
| 7,206,819 B2 * | 4/2007 | Schmidt | ........................ | 709/214 |
| 7,296,267 B2 * | 11/2007 | Cota-Robles et al. | ............ | 718/1 |
| 7,428,485 B2 * | 9/2008 | Armstrong et al. | .............. | 703/21 |
| 7,484,210 B2 * | 1/2009 | Lewites et al. | ..................... | 718/1 |
| 7,565,398 B2 | 7/2009 | Ashok et al. | | |
| 2002/0016892 A1 * | 2/2002 | Zalewski et al. | .............. | 711/153 |
| 2002/0087611 A1 * | 7/2002 | Tanaka et al. | ...................... | 709/1 |
| 2002/0156824 A1 * | 10/2002 | Armstrong et al. | ........... | 709/104 |
| 2003/0055864 A1 * | 3/2003 | Armstrong et al. | ........... | 709/107 |
| 2004/0148605 A1 * | 7/2004 | Kim | ............................... | 718/100 |
| 2005/0022192 A1 * | 1/2005 | Kim | ............................... | 718/100 |
| 2007/0067366 A1 * | 3/2007 | Landis | ......................... | 707/205 |

OTHER PUBLICATIONS

Figueiredo et al. ("A case of grid computing on virtual machines" IEEE, May 2003, p. 1-10).*

* cited by examiner

Primary Examiner — Emerson C Puente
Assistant Examiner — Camquy Truong
(74) Attorney, Agent, or Firm — Wood, Herron & Evans, LLP

(57) ABSTRACT

An apparatus, program product and method distributes work within a logically partitioned computer system by binding a virtual processor or other resource of a hypervisor partition to a partition or physical resource. The partition or physical resource to which the virtual resource is bound is the same partition or physical resource upon whose behalf the hypervisor resource does work. The partition requesting work of the hypervisor partition is thus penalized by virtue the virtual resource using a physical resource owned by the requesting partition.

18 Claims, 5 Drawing Sheets

SYSTEM FOR CORRECT DISTRIBUTION OF HYPERVISOR WORK

FIELD OF THE INVENTION

The present invention relates to computing systems, and more particularly, to dispatching virtual processors to central processing units within a logically partitioned environment.

BACKGROUND OF THE INVENTION

The speed and efficiency of many computing applications depends upon the availability of processing resources. To this end, computing architectures such as the "virtual machine" design, developed by International Business Machines Corporation, share common processing resources among multiple processes. Such an architecture may conventionally rely upon a single computing machine having one or more physical processors, or central processing units (CPU's). The physical processors may execute software configured to simulate multiple virtual processors.

Virtual processors have particular application within a logically partitioned computing system. A partition may logically comprise a portion of a machine's physical processors, memory and other resources, as assigned by an administrator. As such, an administrator may share physical resources between partitions. Each partition typically hosts an operating system and may have multiple virtual processors. In this manner, each partition operates largely as if it is a separate computer.

An underlying program called a hypervisor, or partition manager, uses this scheme to assign and physical resources to each partition. For instance, the hypervisor may intercept requests for resources from operating systems to globally share and allocate them. If the partitions are sharing processors, the hypervisor allocates physical processors between the virtual processors of the partitions sharing the processor.

In an effort to increase the processing speed of computer systems where partitions are sharing processors, system designers commonly implement hypervisor calls. One hypervisor call generally comprises a request from a respective partition to the hypervisor asking to yield access to a physical processor. Virtual processors are dispatched to physical processors. Once the virtual processor is dispatched to a physical processor, a virtual processor can access the processing cycles required to do its work.

Despite the efficiencies afforded by logically partitioned computer systems, certain inherent complexities persist. For instance, sharing physical processors fundamentally requires that while one partition can access a physical processor, another partition that would otherwise use that physical processor must wait. Sub-partition level systems further require CPU cycles and other physical resources to perform, for instance, diagnostic work. This competition for resources can introduce problems concerning fairness of work distribution, i.e., which partitions will have access to a physical resource at a given time. There is consequently a continuing need for an improved manner distributing physical processor cycles throughout a logically partitioned environment.

SUMMARY OF THE INVENTION

Features of the present invention include an apparatus, method, and program product configured to improve the distribution of physical processor cycles throughout a logically partitioned environment by, in one respect, utilizing a hypervisor partition that is capable of hosting a virtual processor that may be bound to a target physical resource. In many instances, the target physical resource does not belong to the hypervisor partition, yet the virtual processor of the hypervisor partition is permitted to perform work using the target physical resource. Such a target physical resource may include a specific physical processor, memory and/or a partition owning a physical processor or other resource.

Distribution of work within the logically partitioned computer may thus include performing work in a first partition on behalf of a second partition by binding a virtual processor of the first partition to a second partition owning a physical resource. In this manner, work may be performed using at least a portion of the physical resource assigned to the second partition.

Another aspect of the invention may allow for the distribution of work within the logically partitioned environment by binding the virtual processor of the hypervisor partition to a physical resource, such as a CPU, that is owned by another partition. The virtual processor of the hypervisor partition may thus perform work on the physical resource.

Still other features of the invention allow the virtual processor of the hypervisor partition to be unbound to the target partition, processor, memory or other target physical resource. The binding processes, themselves, may include marking a control block of the bound virtual processor so that it is associated with the target physical resource. In some instances, a target physical processor to which the virtual processor was previously dispatched will be preempted to allow the virtual processor of the hypervisor to accomplish work.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Features of the present invention include an apparatus, program product and method for distributing work within a logically partitioned computer system by binding a virtual processor or other resource of a hypervisor partition to a partition or physical resource. The partition or physical resource to which the virtual resource is bound is the same partition or physical resource upon whose behalf the hypervisor resource does work. Work accomplished on behalf of a requesting partition may thus be more fairly distributed by virtue of the virtual resource of the hypervisor partition using a physical resource owned by the requesting partition.

The system of the present invention may thus manage the dispatching of virtual processors to physical processors within a partitioned environment. Such features of the invention may more specifically include a virtual processor of a hypervisor partition that may bind to a logical partition, or a physical processor assigned to the logical partition. The virtual processor of the hypervisor partition may alternatively be bound to a particular physical processor.

Figure 1:
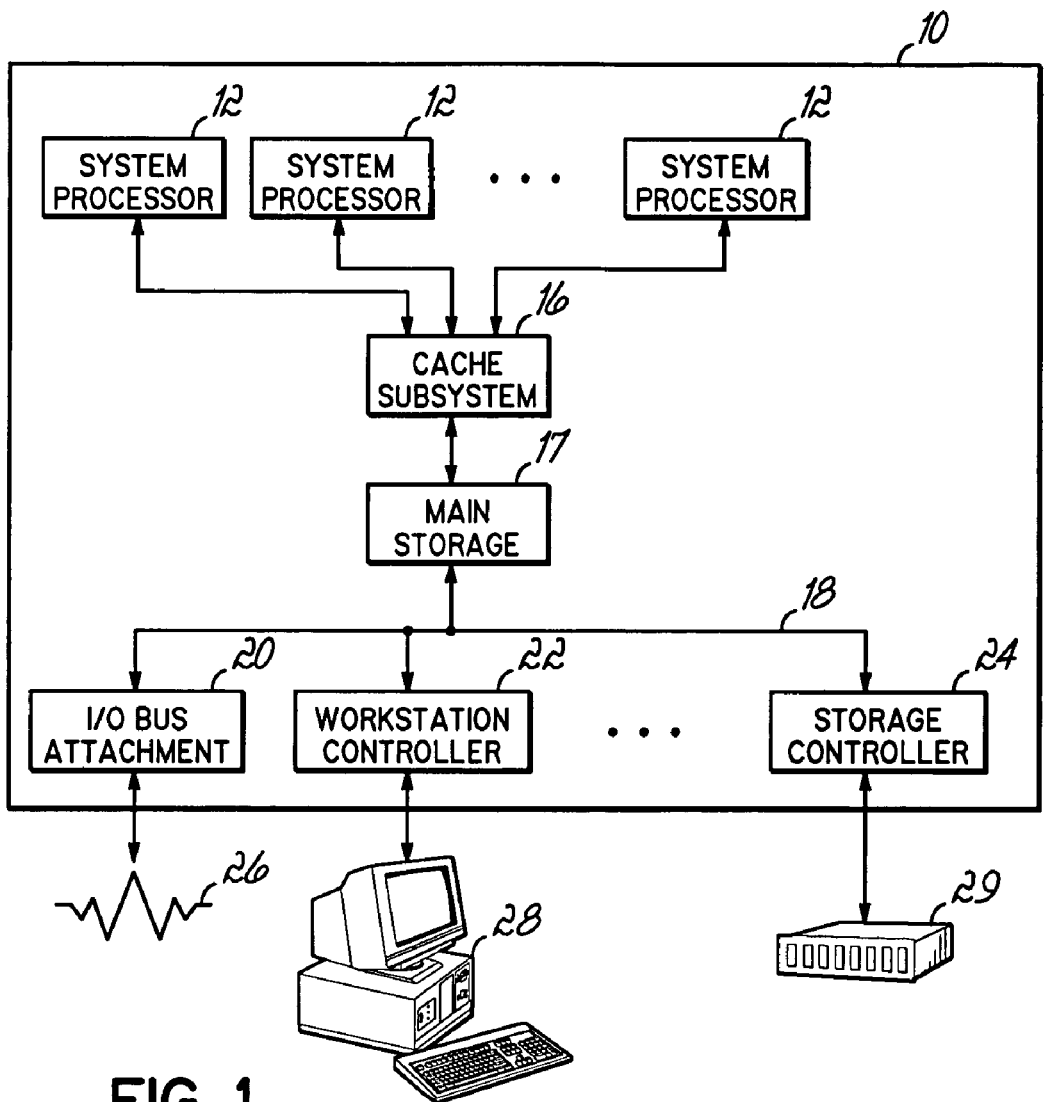
FIG. 1 is a block diagram of a computer consistent with the invention.
Figure 2:
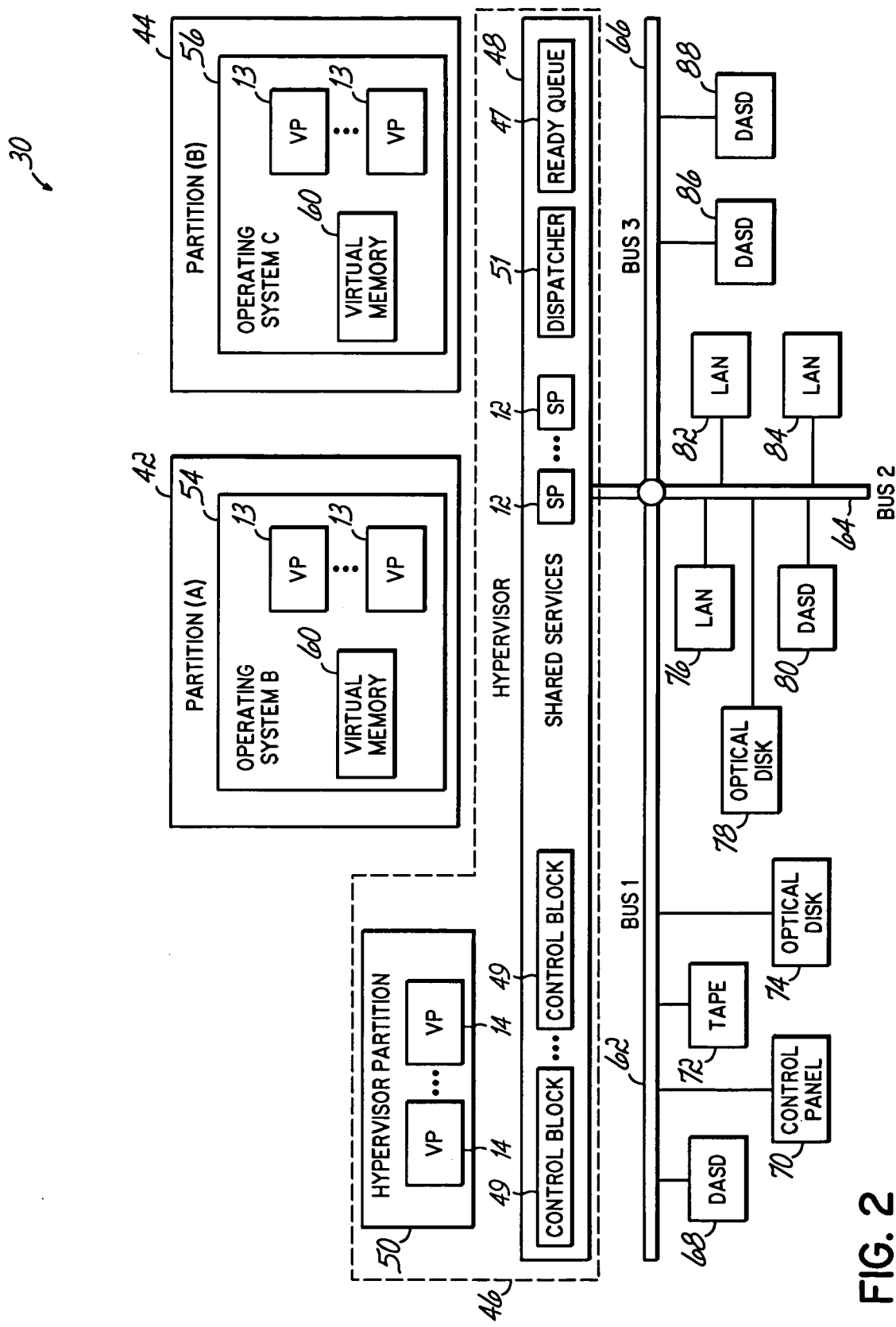
FIG. 2 is a block diagram of the primary software components and resources of the computer of FIG. 1.

While a more particular discussion of an environment suited for execution of such features of the invention follows, the following broad overview is provided in general terms of FIGS. 1 and 2. The hypervisor 46 shown in FIG. 2 includes program code responsible for partition integrity and partition management. To this end, the hypervisor 46 typically includes two layers of software. One such layer may include a partition manager, or hypervisor partition 50. The hypervisor partition 50 is generally used to perform relatively high level operations. Such operations may include an initial program load (IPL) on a partition or concurrent input/output maintenance, for example. This layer of code runs with relocation on and may execute tasks similar to an operating system. In this manner, the hypervisor partition 50 functions as a logical partition on the system 30, except that is hidden from the user. That is, the hypervisor partition 50 does not typically have a user interface like a conventional operating system.

A second layer of code of the hypervisor 46, the shared services block 48, may be invoked by a partition through a hypervisor call. This layer of code is typically invoked for functions that include partition and virtual processor management, including physical processor dispatching and may have no concept of tasks.

Since the hypervisor partition 50 is hidden from the system administrator, there is no physical processor capability assigned to it. The hypervisor dispatcher 51, which is in the shared services block 48 of the hypervisor 46, must consequently steal physical processor cycles to run the virtual processors 14 of the hypervisor partition 50.

The work performed by the hypervisor partition 50 may be categorized into three broad categories. Namely, some work performed by the hypervisor partition 50 may be generated by a specific partition. Examples of such work may include IPL's of a partition, powering-off a partition, and executing a main store dump of a partition. A second work source may include platform work. Examples of such work are platform error recovery, as well as interaction with the service processor or the hardware management console. A third source of work accomplished by the hypervisor partition 50 may include work that has to be performed on a specific physical processor 12. Examples of such work include running diagnostic tests on a physical processor 12 in the system.

Work that is generated by a partition is typically performed by using the physical processors 12 assigned to that partition 42. For example, processor cycle stealing accomplished by the shared services block 48 of the hypervisor 46 should occur from the set of dedicated physical processors that are assigned to the partition that generated the work. A dedicated processor partition is a partition that has exclusive use of a physical processor assigned to it. For a shared processor partition, the work may be performed by a physical processor in a shared pool of that partition that generated the work. A shared processor partition is a partition that shares physical processors with other shared processor partitions. Finally, work that is specific to a physical processor may be performed on that physical processor in order for the effects of the work to be realized on the physical processor.

As discussed below in detail, the above objectives are achieved by binding a virtual processor of the hypervisor partition 50 to a target physical processor 12. The target physical processor 12 may include, for instance, a physical processor assigned to target partition 42 (where the virtual processor 14 is bound to a logical partition 42), and/or a particular physical processor.

There are at least two ways in which a virtual processor of the hypervisor partition 50 is bound to a specific logical partition 42. Namely, the hypervisor partition 50 may have access to special hypervisor calls, i.e., hypervisor calls that are not available to any other logical partition on the system. One such call is the bind to partition hypervisor call. This bind to partition hypervisor call binds the hypervisor partition's virtual processor 14 on which the call is made to the specified, target partition 42. When the hypervisor call returns, the virtual processor will execute on one of the physical processors assigned to the target partition 42; that is, the partition initiating work undertaken by the hypervisor partition 42. If the bound partition is a shared processor partition, the virtual processor of the hypervisor partition 50 will execute on a processor in the shared pool assigned to the target partition.

In another example, a partition 42 may make a hypervisor call that generates work for the hypervisor partition 50. For example, the hypervisor call may generate a virtual interrupt for the hypervisor partition 50. In this case, the shared services block 48 of the hypervisor 46 knows that the virtual processor 14 of the hypervisor partition 50 is the target of the interrupt and binds it to the target partition 42 that made the hypervisor call to generate the interrupt. An example of a hypervisor call that generates a bind to a partition is the call to signal an event message to the hypervisor partition.

As discussed herein, the hypervisor partition 50 has access to special hypervisor calls such as the "bind to physical processor" hypervisor call. This hypervisor call binds the hypervisor partition's virtual processor 14 (on which the call is made) to a specified, target physical processor 12. When the hypervisor call returns, the virtual processor 14 will execute on the target physical processor 12 of the target partition 42 to which it is bound.

A corresponding pair of unbind calls are provided to allow the hypervisor's bound virtual processor to be unbound from a (physical processor of a) partition or a particular physical processor. Once a physical processor is unbound, any partition in the system is able to dispatch the hypervisor partition's virtual processor 14.

Each virtual processor 14 includes a control block comprising memory useful in identifying a bind or other status. When a virtual processor is bound to a partition or a physical processor, the bound partition ID or the bound physical processor index is recorded in the control block of the virtual processor that is being bound. When an unbind call occurs, the control block of the virtual processor is updated to record the fact that it is no longer bound and is free to execute on any physical processor in the system.

If the binding is taking place as a result of an explicit bind to hypervisor call, the hypervisor virtual processor 14 is preempted from the physical processor on which it is currently executing and the virtual processor 14 is put on the ready queue 47 of virtual processors of the hypervisor 46.

When the hypervisor 46 gets control on a physical processor of the bound partition 42 or on the bound physical processor, it checks the hypervisor's ready queue 47 to see whether there is any bound virtual processor that is in a ready to run state. If there is a bound virtual processor that is in the ready to run state, the current virtual processor is preempted, and the bound hypervisor virtual processor is dispatched on the physical processor.

A task in the hypervisor partition 50 may bind and unbind itself to a logical partition 30 as necessary, without regard to execution states it may acquire during the bound interval. During this time, the task may pass through various execution states of running, waiting, and being ready to run. For example, a task performing service on behalf of a partition 42 will bind itself to that partition 42 for the duration of the service regardless of any blocking or preemption it may incur while the service is performed.

In order that multiple tasks may use the bind to partition facility concurrently, the task dispatcher of the hypervisor partition manages the bind to partition and unbind hypervisor calls as necessary to ensure that the virtual processor to logical partition binding is effective as tasks are switched on the virtual processor. The task dispatcher utilizes a per task indicator of the requested bound partition to manage the necessary hypervisor calls.

A task in the hypervisor partition 50 may bind and unbind itself to a virtual processor as necessary, but the task may execute to completion during the interval in which is bound. Furthermore, in the multi-threaded processor environment, all the threads of the virtual processor may be bound to the same physical processor 12.

In a conflicting bind scenario, binding to a physical processor is a stronger bind than binding to a partition. In the case of both binds, the hypervisor partition's physical processor will run on the specified physical processor. When a hypervisor partition's virtual processor is bound to multiple partitions, the last bind call typically is stronger and wins.

On multi-threaded processes where all the threads of the processes must be in the same logical partition, either of the two threads may make the bind/unbind calls to initiate the binding to a partition or a physical processor. These features are discussed more particularly in the hardware and software descriptions that follow.

Hardware and Software Environment

Turning more particularly to the drawings, wherein like numbers denote like parts throughout the several views, FIG. 1 illustrates a data processing apparatus 10 consistent with the invention. Apparatus 10 generically represents, for example, any of a number of multi-user computer systems such as a network server, a midrange computer, a mainframe computer, etc. However, it should be appreciated that the invention may be implemented in other data processing apparatus, e.g., in stand-alone or single-user computer systems such as workstations, desktop computers, portable computers, and the like, or in other computing devices such as embedded controllers and the like. One suitable implementation of apparatus 10 is in a midrange computer such as an iSeries computer available from International Business Machines Corporation.

Apparatus 10 generally includes one or more physical processors 12 coupled to a memory subsystem including main storage 17, e.g., an array of dynamic random access memory (DRAM). Where desired, the physical processors may be multithreaded. Also illustrated as interposed between multithreaded physical processors 12 and main storage 17 is a cache subsystem 16, typically including one or more levels of data, instruction and/or combination caches, with certain caches either serving individual processors or multiple processors as is well known in the art.

Furthermore, main storage 17 is coupled to a number of types of external (I/O) devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 29.

FIG. 2 illustrates in greater detail the primary software components and resources utilized in implementing a logically partitioned, multithreaded physical processors environment on apparatus 10 of FIG. 1, including a plurality of logical partitions 42, 44 managed by the hypervisor 46. Any number of logical partitions may be supported as is well known in the art.

Each logical partition 42, 44 utilizes an operating system (e.g., operating systems 54 and 56 for logical partitions 42 and 44, respectively), that controls the primary operations of the logical partition in the same manner as the operating system of a non-partitioned computer. Each logical partition 42, 44 executes in a separate memory space, represented by virtual memory 60. Moreover, each logical partition 42, 44 is statically and/or dynamically allocated a portion of the available resources in apparatus 10. For example, each logical partition may share one or more physical processors 12, as well as a portion of the available memory space for use in virtual memory 60. In this manner, a given processor may be utilized by more than one logical partition.

FIG. 2 also shows a partition 50 that comprises part of the hypervisor 46. This hypervisor partition 50 functions in many ways like the conventional partitions 42, 44 (and operating systems), but has no user interface for the customer. Because the hypervisor partition 50 by design lacks a user interface, it is "hidden" from the user. This hidden feature protects the hypervisor partition from failures that might otherwise come about through user interaction. For instance, where commands input to a conventional operating system cause the operating system to crash, the computer system 30 may still have the use of the hypervisor partition, possibly to complete the work of the failing operating system. The system 30 may thus use the hypervisor partition 50 as an additional resource of virtual processors.

The hypervisor partition 50 may make special hypervisor calls configured to bind a virtual processor 14 of the hypervisor partition 50 to a target physical processor 12. As such, the hypervisor partition 50 may make a hypervisor call to the shared services block 48 of the hypervisor 46. The shared services block 48 is responsible for managing the dispatching of virtual processors to physical processors on a dispatch list, or ready queue 47. The ready queue 47 comprises memory that includes a list of virtual processors having work that is waiting to be dispatched on a physical processor 12. Virtual processors added to the list comprising the ready queue 47 are said to be "read to run." The hypervisor 46 shown in FIG. 2 also includes physical (system) processors 12, in addition to processor control blocks 49. The processor control blocks 49 comprise memory that includes a list of virtual processors waiting for access on a particular physical processor 12.

A target processor for purposes of this specification may generally include one of a set of physical processor belonging to a partition, or a physical processor that itself, would benefit from work accomplished using a virtual processor 14 of the hypervisor partition 50. In one particular example, a target physical processor for purposes of a hypervisor call made by the hypervisor partition 50 may comprise a physical processor dedicated and/or shared by a partition 42. The target physical processor/resource may typically requires work to be done by a virtual processor 14 of the hypervisor partition 50 on behalf of that partition 14. For instance, one hypervisor call may bind the virtual processor 14 of the hypervisor partition 50 to a physical processor or pool of physical processors dedicated to a target partition.

Another type of targeted physical processor bound by a hypervisor call from the hypervisor partition may include a particular physical processor that needs some function performed on it by the virtual processor of the hypervisor partition. Such a function may include, for instance, diagnostic tests.

In this manner, a hypervisor call generated by the hypervisor partition 50 may initiate preempting a virtual processor that would otherwise be dispatched on the physical processor. For instance, such a call may function to preempt another virtual processor that was already waiting on the ready queue. Another such call may result in a virtual processor losing access to the physical processor to allow use by the bound virtual processor of the hypervisor partition 50.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to a partition.

Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 2 is merely exemplary in nature, and that any combination and arrangement of resources may be allocated to any logical partition in the alternative. For instance, while only one hypervisor partition 50 is shown in FIG. 2, one skilled in the art will appreciate that more such partitions may be included if desired. Moreover, it will be appreciated that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 2 and implementing the embodiments of the invention may be implemented in a number of manners, including using various computer software applications, routines, components, programs, objects, modules, data structures, etc., referred to hereinafter as "computer programs," "programs" or "program code." Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable signal bearing medium used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Processes for Distributing Hypervisor Work

Figure 3:
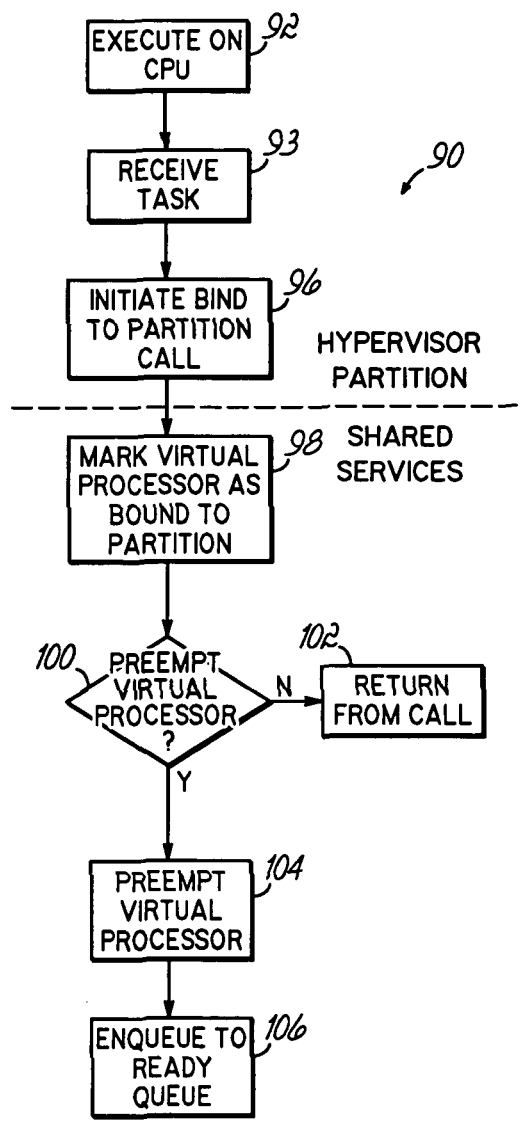
FIG. 3 is a flowchart having steps initiated by the hypervisor partition of FIG. 2 suited for binding a virtual processor of the hypervisor to a target physical processor assigned to a target partition.

FIG. 3 shows a flowchart 90 having a set of exemplary steps executable by the hardware and software systems of FIGS. 1 and 2 that are suited to bind a virtual processor 14 of the hypervisor partition 50 to a physical processor 12 of a target partition 42. More particularly, the steps of the flowchart 90 result in the virtual processor 14 of the hypervisor partition preempting a virtual processor 13 of a primary, target partition 42. The virtual processor 14 of the hypervisor partition 50 may be enqueued to the ready queue 47 in anticipation of being dispatched by the shared services block 48. As shown in FIG. 3, those steps 92-96 denoted above the dotted line are steps that are initiated by a virtual processor 14 of the hypervisor partition 50. Those remaining steps 98-104 located below the dotted line are initiated by the shared services block 48 of the hypervisor 46.

Turning more particularly to FIG. 3, the virtual processor 14 of the hypervisor partition 50 may be executing at block 92 on a physical processor 12. As such, the virtual processor 14 executing at block 92 may have previously been dispatched by the shared services block 48 of the hypervisor 46 to the physical processor 12.

At block 93 of FIG. 3, the hypervisor partition 50 recognizes that it has been dispatched to perform a task on behalf of a specific partition. For example, a partition 42 may request that a main storage dump be accomplished on behalf of the requesting partition 42. This task may initiate processes at block 93 that cause a virtual processor 14 of the hypervisor partition 50 to be dispatched to a physical processor 12 in order to accomplish the dump.

As discussed herein, the hypervisor partition 50 functions in some ways like a conventional operating system. However, the hypervisor partition 50 includes no interface for a user. This feature protects the hypervisor partition from causes of failure that conventional operating systems may in some instances be otherwise vulnerable to. As such, the hypervisor partition 50 may function as a robust source of virtual processing power for the system 30. However, the hypervisor partition 50 may make special hypervisor calls. The special hypervisor calls enable the virtual processors 14 of the hypervisor partition 50 to be bound to a target physical processor 12. Such a target processor may include a physical processor belonging to a target partition to which the virtual processor 14 is bound, or a physical processor that itself, would benefit from work accomplished using the virtual processor 14 of the hypervisor partition 50.

The hypervisor partition 50 makes a bind to partition hypervisor call at block 96. This hypervisor call typically identifies the partition 42 that initiated the dispatch of the virtual processor 14 at block 93. In so doing and as will be clear after a full reading of the specification, the physical processor 12 to which the virtual processor 14 is dispatched to will be one that is dedicated to, shared by, owned by or otherwise assigned to the requesting partition 42.

In response to the hypervisor bind call of block 96, the shared services block 48 of the hypervisor 46 may mark at block 98 of FIG. 3 the virtual processor 14 as being bound to the target partition 42 in the control block of the virtual processor 14.

The hypervisor 46 at block 100 of FIG. 3 determines whether the virtual processor 14 needs to be preempted. Namely, the hypervisor 46 may determine whether the virtual processor 14 of the hypervisor partition 50 is by some coincidence, already executing on a physical processor 12 of the target partition 42. In such an instance, the virtual processor 14 does not need to be preempted because the virtual processor 14 of the hypervisor partition 50 is already dispatched to the target physical processor owned by the target partition. The hypervisor call is subsequently returned at block 102. As such, no change is made in the operating status of the virtual processor 14 as it continues to execute on the physical processor 14 as back at block 92.

Where the virtual processor is alternatively executing on a physical processor that is not associated with the target partition at block 100, then the hypervisor 46 will typically preempt the virtual processor 14 at block 104 of FIG. 3. This preemption may include removing the virtual processor 14 from the physical processor 12. In the present case, the physical processor 12 is associated with the target partition 42.

The hypervisor 46 will then typically enqueue the virtual processor 14 to the ready queue 47, as shown at block 106 of FIG. 3. The ready queue 47 includes a list of virtual processors that have work and are waiting for the hypervisor 46 to dispatch them to a physical processor 12. In one embodiment that is consistent with invention, the hypervisor 46 enqueues the virtual processor to the next in line position of the ready queue 47 so that when the virtual processor 14 is dispatched to the physical processor 12 associated with the target partition 42, it will immediately begin to execute on that physical processor 12. However, one skilled in the art will appreciate that the hypervisor 46 may alternatively enqueue the virtual processor 14 to the end or some other position of the ready queue 47 as per operating preferences set by an administrator.

Figure 4:
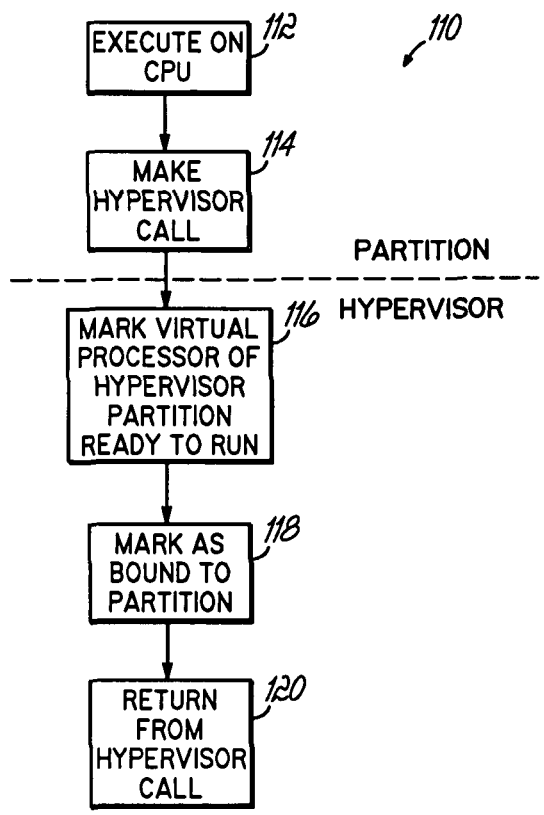
FIG. 4 is a flowchart having steps initiated by the target partition of FIG. 2 suited for binding a virtual processor of the hypervisor to a target physical processor assigned to the target partition.

FIG. 4 shows another sequence of exemplary steps of a flowchart 110 additionally suited for execution by the systems of FIGS. 1 and 2. More particularly, steps 112 and 114 of the flowchart are initiated by a target partition 42, while steps 116-120 located below the dotted line are executed by the hypervisor 46 of FIG. 2. In one sense, the steps of the flowchart 110 show an alternative manner in which a virtual processor 14 may become bound to a target partition 42, as opposed to the method disclosed in the text describing FIG. 3. That is, in contrast to the steps initiated by the hypervisor partition 50 in FIG. 3, the steps shown above the dotted line of FIG. 4 are initiated by the target partition 42.

Turning more particularly to block 112 of FIG. 4, the virtual processor 13 of the target partition 42 executes on a physical processor 12 associated with the target partition 42.

At block 114 of FIG. 4, the target partition 42 makes a hypervisor call that generates work for the hypervisor partition 50. Such a hypervisor call may include, for instance, a request for information to which the hypervisor partition 50 has access.

In response to the hypervisor call from the partition 42, the hypervisor 46 at block 116 of FIG. 4 may mark the virtual processor 14 of the hypervisor partition 50 as being ready to run. The ready to run state enabled by the hypervisor 46 lets the system 30 know that the virtual processor 14 has work it needs to execute on a physical processor belonging to a partition 42. The hypervisor 46 may also mark at block 118 the virtual processor 14 as being bound to the target partition 42 in the control block of the virtual processor 14. The hypervisor 46 may then return the hypervisor call at block 120 to the target partition 42 as is known in the art.

Figure 5:
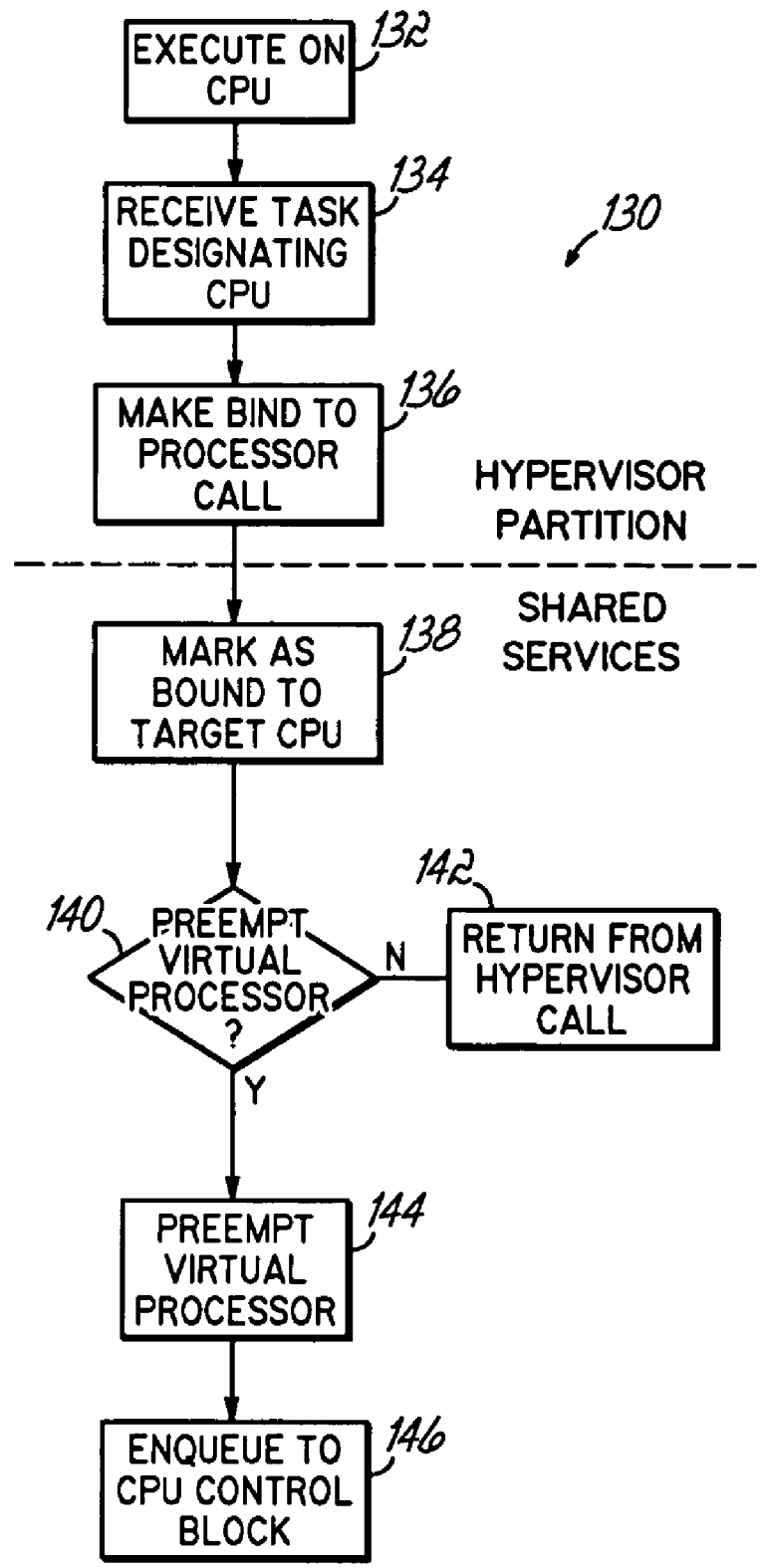
FIG. 5 is a flowchart having steps suited for binding the virtual processor of the hypervisor of FIG. 2 to a particular target physical processor.

FIG. 5 shows a flowchart 130 having a sequence of exemplary steps suitable for execution by the hardware and software systems of FIGS. 1 and 2. More particularly, the steps of the flowchart 130 are configured to bind a virtual processor 14 of the hypervisor partition 50 of FIG. 2 to a specific physical processor 12. Such may be the case where the specific physical processor 12 is in need of diagnostic or other services. Steps 132-136 located above the dotted line of FIG. 5 may be initiated by the hypervisor partition 50. The steps 138-144 located below the dotted line may be initiated by the hypervisor 46.

Turning more particularly to block 132 of FIG. 5, the virtual processor 14 of the hypervisor partition 50 is executing on a physical processor 12. As discussed herein, this execution may be the result of a previous dispatch by the hypervisor 46 of a physical processor 12 to the virtual processor 14. The hypervisor partition 50 receives a task at block 134 that results in the virtual processor 14 being dispatched to perform a function on a specific, target processor 12. In response to the receipt of the task at block 134, the hypervisor partition 50 at block 136 may make a bind to processor hypervisor call.

The hypervisor 46 marks the virtual processor 14 as bound to the target processor 12 at block 138 in response to the hypervisor call made at block 136. The virtual processor 14 may be more specifically marked as bound in readable memory included within the virtual processor 14.

The hypervisor 46 determines whether the virtual processor 14 needs to be preempted at block 140. For example, the virtual processor 14 does not need to be preempted where it happens to be already executing on the target physical processor 12. In such an instance, the hypervisor 46 instead returns the hypervisor call at block 142.

Where the virtual processor 14 of the hypervisor partition 50 is alternatively executing on a physical processor other than the target processor, then the hypervisor 46 may preempt the virtual processor at block 144. The hypervisor 46 may subsequently or concurrently enqueue the virtual processor 14 to the physical, target processor 12 at the appropriate processor control block 49. Such an enqueue may include an identifier associated with the target processor being stored in the processor control block 49 in association with an identifier of the virtual processor 14.

Figure 6:
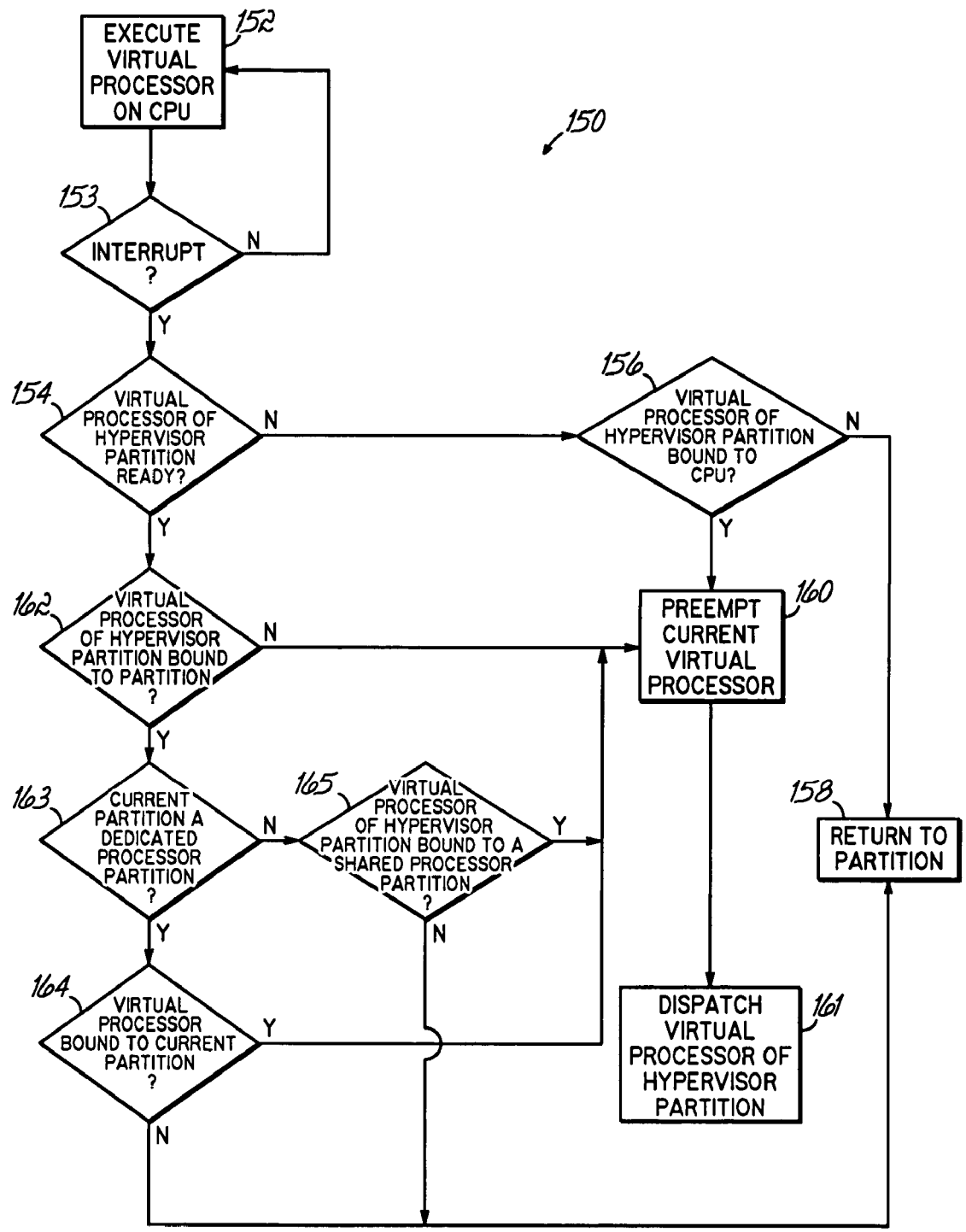
FIG. 6 is a flowchart having steps suited for dispatching the virtual processor of the hypervisor of FIG. 2 onto a target physical processor.

FIG. 6 shows a flowchart 150 having an exemplary sequence of steps suited for execution by the hardware and software environments of FIGS. 1 and 2 for dispatching the virtual processor 14 of the hypervisor partition 50 onto a target physical processor 12. At block 152 of FIG. 6, a virtual processor 13 of a partition 42 executes on a physical processor 12. Thus, block 152 presupposes that the hypervisor 46 has previously dispatched the virtual processor 13 to the physical processor 12.

At block 153 of FIG. 6, an interrupting event occurs. Such interruption may include a timer event. A timer event may include a feature of the system 30 that allows the hypervisor 46 to periodically regain control of a physical processor 12. For instance, a virtual processor 14 may be timed-out or interrupted every ten milliseconds. This feature may allow the hypervisor 46 to redistribute virtual processors on the physical processors 12 as needed for efficiency and priority considerations.

The hypervisor 46 may determine at block 154 whether there is a virtual processor 14 of the hypervisor partition 50 on the ready queue 47. As discussed herein, the ready queue 47 may be used to track virtual processor assignments. Put another way, the hypervisor 46 determines at block 154 if a hypervisor virtual processor 14 has work to do.

Where no virtual processor 14 of the hypervisor partition 50 has work to do as indicated on the ready queue 47, then the hypervisor 46 may determine at block 156 whether there is a virtual processor 14 of the hypervisor partition 50 that is bound to the current physical processor. To do this, the hypervisor 46 may check the processor control block 49 associated with the processor on which it is currently executing. Where no such bound status is found by the hypervisor 46 at block 156, then the hypervisor 46 may return the physical processor 12 back to the partition 42 at block 158. That is, the virtual processor 13 may be allowed to continue executing at block 158 as before the interrupting event of block 153.

Where the hypervisor 46 alternatively determines at block 156 that a virtual processor 14 of the hypervisor partition 50 is bound to a targeted, specific physical processor, then the hypervisor 46 may preempt at block 160 the virtual processor 13 that is currently on the physical processor 12. The virtual processor 14 of the hypervisor partition 50 may then be dispatched to the target physical processor 12 at block 161 of FIG. 6.

Where the hypervisor 46 alternatively determines at block 154 that a virtual processor 14 of a hypervisor partition 50 is on the ready queue 47, then the hypervisor may determine at block 162 whether or not the virtual processor 14 is bound to a partition. Where the virtual processor 14 is not bound to a partition, then the hypervisor 46 may preempt the virtual processor 13 currently dispatched to the physical processor, and in its place, dispatch the virtual processor 14 of the hypervisor partition 50 to the physical processor 12 at blocks 160 and 161, respectively. Such may be the case at block 162 where the virtual processor 14 is doing system work.

Where the virtual processor 14 is determined to be bound to a partition at block 162, then the hypervisor 46 may further determine at block 163 whether the current partition is dedicated to a processor partition. If so then the hypervisor 46 may determine at block 164 if the virtual processor 14 of the hypervisor partition 50 is bound to the partition 42 that is currently using the physical processor 12. That is, the hypervisor 46 may determine whether the virtual processor 14 of the hypervisor partition 50 is bound to the partition 42 currently executing on the processor. If the virtual processor 14 is bound to the partition 42 whose virtual processor 13 is currently executing on the target physical processor 12, then the hypervisor 46 may need to free up access to the target physical processor. Namely, the hypervisor 46 may preempt the virtual processor 13 currently running on the physical processor 12 associated with the target partition 42, and dispatch the virtual processor 14 of the hypervisor partition onto that target physical processor 12 at blocks 160 and 161, respectively.

Where the virtual processor 13 is currently executing on the physical processor that is alternatively not associated with the target partition, then there may be no need for the hypervisor 46 to interrupt or preempt the work of the virtual processor, and the hypervisor 46 may instead return control of the physical processor 12 to the virtual processor at block 158 at the point where the interrupt of block 153 occurred.

Where the virtual processor 14 of the hypervisor partition 50 is bound to a shared processor partition at block 165, then the hypervisor 46 may preempt the virtual processor 13 currently dispatched to the physical processor, and in its place, dispatch the virtual processor 14 of the hypervisor partition 50 to the physical processor 12 at blocks 160 and 161, respectively. Where the virtual processor 14 is alternatively not bound to a shared processor partition at block 165, the hypervisor 46 may return control of the physical processor 12 to the virtual processor at block 158 at the point where the interrupt of block 153 occurred.

While the present invention has been illustrated by a description of various embodiments and while these embodiments have been described in considerable detail, it is not the intention of the applicants to restrict, or in any way limit, the scope of the appended claims to such detail. As such, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for distributing work within a logically partitioned data processing system, wherein the data processing system supports a plurality of partitions including a plurality of virtual resources, wherein the data processing system is configured to assign ownership of the plurality of physical resources to the plurality of partitions and wherein at least one of the plurality of partitions includes a hypervisor partition that lacks a user interface, the method comprising binding a virtual resource of the hypervisor partition to a target physical resource assigned to another partition to perform work for the hypervisor partition using the target physical resource without assigning ownership of the target physical resource to the hypervisor partition, wherein the virtual resource comprises a virtual processor and the target physical resource comprises a physical processor,
   wherein the method further comprises unbinding the virtual resource of the hypervisor partition from the target physical resource after performing the work for the hypervisor partition, and
   wherein binding the virtual resource further includes enqueuing to a dispatch list used to dispatch the virtual resource an identifier associated with the virtual resource and initiating binding in response to a hypervisor call made by one of the plurality of partitions.

2. The method of claim 1, wherein the binding further includes binding the virtual resource of the hypervisor partition to at least one of a partition, a physical processor and a memory.

3. The method of claim 1, wherein binding the virtual resource further includes marking a control block of the virtual resource as bound to the target physical resource.

4. The method of claim 1, wherein binding the virtual resource further includes preempting a virtual resource that was previously dispatched to the target physical resource.

5. The method of claim 1, wherein binding the virtual resource further includes initiating binding in response to a hypervisor call made by the hypervisor partition.

6. The method of claim 1, wherein binding the virtual resource further includes initiating binding using the hypervisor partition.

7. A method for distributing work within a logically partitioned data processing system, wherein the data processing system supports a plurality of partitions including a plurality of virtual resources, the method comprising in a first partition, which is a hypervisor partition that lacks a user interface, performing work on behalf of a second partition to which ownership of a physical resource is assigned by binding a virtual resource of the first partition to the second partition while maintaining assignment of ownership of the physical resource to the second partition such that the work is performed by the first partition using at least a portion of the physical resource owned by the second partition, wherein the virtual resource comprises a virtual processor and the target physical resource comprises a physical processor,
    wherein the method further comprises unbinding the virtual resource of the first partition from the second partition after performing the work on behalf of the second partition, and
    wherein binding the virtual resource further includes enqueuing to a dispatch list used to dispatch the virtual resource an identifier associated with the virtual resource of the first partition and initiating binding in response to a hypervisor call made by the first partition.

8. The method of claim 7, wherein binding the virtual resource further includes marking a control block of the virtual resource of the first partition as bound to the second partition.

9. The method of claim 7, wherein binding the virtual resource further includes preempting a virtual resource of another partition that was previously dispatched to the physical resource owned by the second partition.

10. The method of claim 7, wherein binding the virtual resource further includes initiating binding in response to a hypervisor call made by the second partition.

11. A method for distributing work within a logically partitioned data processing system, wherein the data processing system supports a plurality of partitions including a plurality of virtual resources, wherein at least one of the partitions includes a hypervisor partition that lacks a user interface, the method comprising binding a virtual resource of the hypervisor partition to a physical resource to which ownership is assigned to another partition while maintaining assignment of ownership of the physical resource to the other partition to perform work for the hypervisor partition on the physical resource, wherein the virtual resource comprises a virtual processor and the target physical resource comprises a physical processor,
    wherein the method further comprises unbinding the virtual resource of the hypervisor partition from the physical resource after performing the work for the hypervisor partition, and
    wherein binding the virtual resource further includes enqueuing to a dispatch list used to dispatch the virtual resource an identifier associated with the virtual resource of the hypervisor partition and initiating binding in response to a hypervisor call made by the hypervisor partition.

12. The method of claim 11, wherein binding the virtual resource further includes marking a control block of the virtual resource of the hypervisor partition as bound to the physical resource.

13. An apparatus comprising:
    a logically partitioned computer including at least one hardware processor and supporting a plurality of partitions including a plurality of virtual resources, wherein at least one of the partitions includes a hypervisor partition that lacks a user interface; and
    program code resident in the logically partitioned computer, the program code configured to bind a virtual resource of the hypervisor partition to a target physical resource assigned to another partition to perform work for the hypervisor partition using the target physical resource without assigning ownership of the target physical resource to the hypervisor partition, wherein the virtual resource comprises a virtual processor and the target physical resource comprises a physical processor,
    wherein the program code initiates unbinding the virtual resource of the hypervisor partition from the target physical resource after performing the work for the hypervisor partition, and
    wherein the program code binds the virtual resource by enqueuing to a dispatch list used to dispatch the virtual resource an identifier associated with the virtual resource and initiating binding in response to a hypervisor call made by one of the plurality of partitions.

14. The apparatus of claim 13, wherein the target physical resource includes at least one of a partition, a physical processor and a memory.

15. The apparatus of claim 13, wherein program code initiates marking a control block of the virtual resource as bound to the target physical resource.

16. The apparatus of claim 13, wherein program code initiates preempting a virtual resource that was previously dispatched to the target physical resource.

17. The apparatus of claim 13, wherein the program code initiates performing the work on the target physical resource.

18. A program product, comprising:
    program code for distributing work within a logically partitioned data processing system, wherein the data processing system supports a plurality of partitions including a plurality of virtual resources, wherein at least one of the partitions includes a hypervisor partition that lacks a user interface, the program code configured to bind a virtual resource of the hypervisor partition to a physical resource to which ownership is assigned to another partition while maintaining assignment of ownership of the physical resource to the other partition to perform work for the hypervisor partition on the physical resource,
    wherein the program code initiates unbinding the virtual resource of the hypervisor partition from the physical resource after performing the work for the hypervisor partition, and
    wherein the program code binds the virtual resource by enqueuing to a dispatch list used to dispatch the virtual resource an identifier associated with the virtual resource and initiating binding in response to a hypervisor call made by one of the plurality of partitions; and
    a non-transitory computer readable medium storing the program code.

\* \* \* \* \*